United States Patent [19]

Cooper

[11] Patent Number: 4,504,650

[45] Date of Patent: Mar. 12, 1985

[54] COPOLYETHERIMIDES AND PROCESS OF PREPARATION

[75] Inventor: Stephen M. Cooper, Pittsfield, Mass.

[73] Assignee: General Electric Company, Pittsfield, Mass.

[21] Appl. No.: 558,176

[22] Filed: Dec. 5, 1983

[51] Int. Cl.³ ............................................. C08G 73/10
[52] U.S. Cl. ..................................... 528/185; 528/125; 528/126; 528/128; 528/172; 528/179
[58] Field of Search ............... 528/125, 126, 128, 172, 528/179, 185

[56] References Cited

U.S. PATENT DOCUMENTS

| | | | |
|---|---|---|---|
| 3,699,075 | 10/1972 | Lubowitz | 528/172 |
| 3,803,085 | 4/1974 | Takekoshi et al. | 528/185 |
| 3,833,546 | 9/1974 | Takekoshi et al. | 528/185 |
| 3,847,867 | 11/1974 | Heath et al. | 528/185 |
| 3,850,885 | 11/1974 | Takekoshi et al. | 528/185 |
| 3,875,116 | 4/1975 | Heath et al. | 528/185 |
| 3,917,643 | 11/1975 | Takekoshi et al. | 260/326 R |
| 3,983,093 | 9/1976 | Williams et al. | 528/172 |

*Primary Examiner*—Lester L. Lee
*Attorney, Agent, or Firm*—William F. Mufatti; Edward A. Hedman; John W. Harbour

[57] ABSTRACT

Copolyetherimides having random units in the structure and characterized by good transparency after molding are prepared by a process in which a dianhydride and a diamine are reacted at a temperature of at least 100° C. to initiate polymerization, followed by the addition of a second anhydride and continuing the polymerization at the elevated temperature. Preferred features include conducting the reaction in a solvent and in the presence of a chain stopper, such as phthalic anhydride.

17 Claims, No Drawings

COPOLYETHERIMIDES AND PROCESS OF PREPARATION

BACKGROUND OF THE INVENTION

Polyetherimides constitute a class of polymers which are useful for a variety of purposes, such as in coatings, films and molded articles. Typically, these copolymers are produced by the reaction between a diamine and one or more dianhydrides, either in the presence of a solvent or by melt polymerization.

In a process described in U.S. Pat. No. 3,917,643 (Takekoshi, et al.), a polyetherimide is prepared by the reaction of an aromatic bis(ether anhydride) and a diamine in a phenolic solvent. The result is a solution of the polymer in the phenol which can be used directly as a wire coating enamel, or, alternatively, which can be treated to separate the polymer.

A process for the preparation of a copolyetherimide from a mixture of an organic diamine, a bisphenol dianhydride and a comonomeric dianhydride, for example, pyromellitic, sulfur or benzophenone dianhydride, is described in U.S. Pat. No. 3,983,093 (Williams, et al.). The procedure is based on the use of reaction temperatures of from about 100° to about 250° C. if solvent polymerization is employed, and 200° to 400° C. if melt polymerization is utilized. No criticality as to the order of addition of the coreactants is disclosed, and as shown in the examples all of the ingredients are included in the reaction mixture before polymerization is begun.

Experiments have shown that if the dianhydrides and diamine are added to the initial reaction mixture and polymerization is then initiated and run to completion, the resulting copolyetherimide is not completely transparent upon molding, particularly if it contains more than 5 mole percent of the comonomer dianhydride. The reduced optical clarity can be disadvantageous if the copolymer is intended for industrial and commercial purposes where full transparency is an important feature.

INTRODUCTION TO THE INVENTION

The discovery has now been made of a new procedure for the preparation of a copolyetherimide which results in a highly transparent polymer and good physical properties, including a relatively low melt index. The procedure, or process, involves initiating polymerization at a temperature of at least 100° C. between a dianhydride and a diamine, and thereafter adding another dianhydride as the polymerization proceeds to completion. The order of addition is significant. A comparison study shows that if all of the co-reactants are simply added together to the starting mixture, rather than in the order prescribed above, the resulting copolyetherimide is characterized by less transparency, and the melt index is higher (which usually means it has a lower molecular weight and will not be as tough after molding).

DESCRIPTION OF THE INVENTION

In its broadest aspects, the invention thus comprises the preparation of a copolyetherimide having random repeating units, by a method comprising
(a) providing a reaction mixture of
(1) a dianhydride of the formula

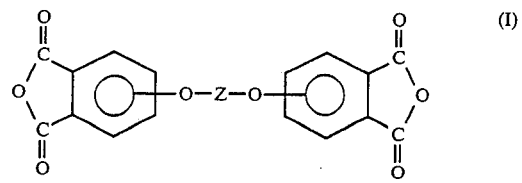

in which Z is a divalent arylene, with
(2) a diamine of the formula

in which R is a divalent organic radical;
(b) heating the reaction mixture to a temperature of at least 100° C. to initiate polymerization; and
(c) adding to the reaction mixture a dianhydride of the formula

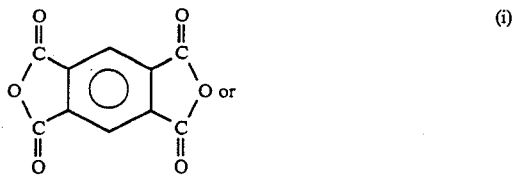

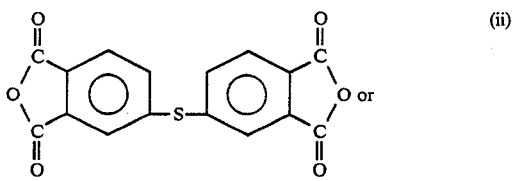

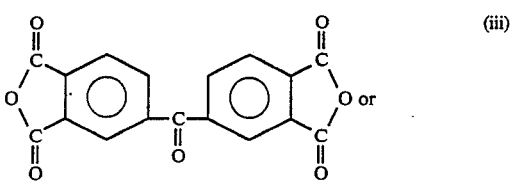

(iv) a mixture of any of the foregoing, while continuing to heat the reaction mixture at a temperature of at least 100° C., whereby the polyetherimide is formed.

Reaction can be effected at temperatures of from 100° to 250° C., but usually the process is carried out at temperatures of at least 120° C., and preferably from about 120° to about 200° C.

Preferred embodiments of compounds within formula I, above, are those in which Z can be any of the following:

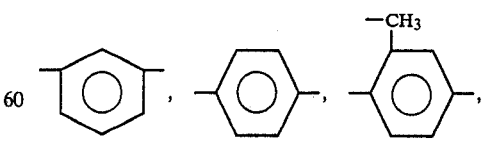

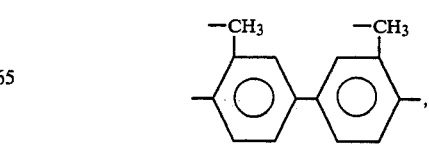

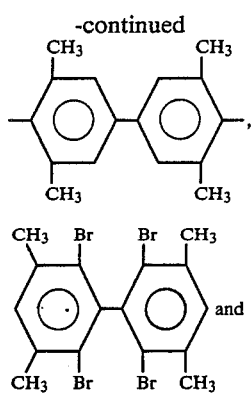

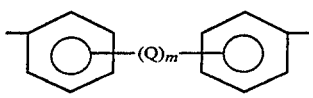

where Q is selected from among —O—, $$-\overset{O}{\underset{}{\overset{\|}{C}}}-,\ -\overset{O}{\underset{O}{\overset{\|}{\underset{\|}{S}}}}-,$$

—S— and —C$_x$H$_{2x}$— in which x is a whole number from 1 to 5, and m is 0 or 1.

Examples of diamines within formula II, above, and which are useful in the practice of this inventiion are the following:

m-phenylenediamine,
p-phenylenediamine,
4,4'-diaminodiphenylpropane,
4,4'-diaminodiphenylmethane, benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-diamino-4-isopropylbenzene,
m-xylylenediamine,
p-xylylenediamine,
2,4-diaminotoluene,
2,6-diaminotoluene,
bis(4-aminocyclohexyl)methane,
3,-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane, and
bis(4-aminobutyl)tetramethyldisiloxane.

Additional preferred compounds are those in which Z is the following

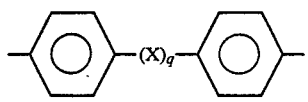

in which X is a divalent radical such as —C$_y$H$_{2y}$,

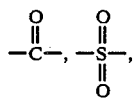

—O—, or —S—, and where q is zero or 1, and y is a whole number from 1 to 5.

Examples of particular compounds within formula I include:

2,2-bis(4-(2,3-dicarboxyphenoxy)phenyl) propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride;
2,2-bis(4-(3,4-dicarboxyphenoxy)phenyl)propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride; and
4-(2,3-dicarboxyphenoxy)-4'(3,4-dicarboxyphenoxy)-diphenyl-2,3-propane dianhydride.

Useful diamines within Formula II are especially those in which R is a divalent organic radical selected from the group consisting of (1) aromatic hydrocarbon radicals having from 6 to 20 carbon atoms and halogenated derivatives, (2) alkylene and cycloalkylene radicals having from 2 to 20 carbon atoms, (3) C$_{2-8}$ alkylene-terminated polydiorganosiloxanes, and (4) divalent radicals of the formula:

The reaction is preferably carried out in a solvent or mixture of two or more miscible solvents. Relatively low boiling liquids such as cresol, toluene, cyclohexane, benzene, dichlorobenzene, and the like are illustrative of those solvents which may be employed.

Preferably, but not necessarily, the second dianhydride, to be employed in step (c), is added to the reaction mixture in divided portions of two and especially three or more.

Substantially equimolar proportions of the co-reactants may be employed, or the amounts can be varied from between 0.5 to 2.0 moles of dianhydrides (total) for each mole of diamine.

To facilitate the reaction, it is advantageous to agitate the reaction mixture, and this may be accomplished by use of a mechanical mixer of conventional design.

The reaction time will usually vary from about 0.5 to about 20 hours, depending upon the temperature, degree of stirring, rate of addition and the nature of the particular reactants, as well as other factors.

Termination of the reaction and control of the polymer chain length can be accomplished by use of a chain terminating compound, for example, an amine, phthalic acid or phthalic anhydride, in the reaction mixture. Preferably, the chain terminator (or chain stopper, as it is also termed) is included in the starting mixture. Polyetherimides of from about 5 to about 500 repeating units are preferred, and to accomplish this it is desirable to employ a small effective amount of the chain stopper.

Upon completion of the reaction, the copolyetherimide may be recovered by high vacuum distillation of the reaction mixture to remove the solvent(s) and any other volatile materials. Alternatively, recovery may be accomplished by pouring the mixture into an antisolvent, for example, methanol, to induce precipitation of the polymer.

The copolyetherimides are useful as films, a component in coating compositions and as molding materials. Because of their high degree of transparency, they are especially useful in the manufacture of medical equipment and parts requiring glazing materials having good optical clarity.

DESCRIPTION OF THE SPECIFIC EMBODIMENTS

The invention is illustrated in the following examples, which are intended to show preferred or best embodiments but are otherwise not to be construed as a limitation on the scope of the invention.

EXAMPLE 1

A 100 gallon reactor was charged with 200 pounds of 2,2-bis(4-(2,3-dicarboxyphenoxy)phenyl)propane dianhydride, 59.2 grams of phthalic anhydride, and 21 grams of sodium phenyl phosphinate. The mixture was agitated for 20 to 30 minutes, after which 50.84 pounds of meta-phenylene diamine were added. The temperature was raised to 120°-122° C. and the condensate was collected over the reactor and drained off to a waste drum.

During the heating period, 20.01 pounds of pyromellitic anhydride were placed in the charge pot over the reactor. When the desired temperature was reached, the charge pot was pressurized with 5 psig of nitrogen. The charging valve was opened for five seconds to allow about one-fifth of the total amount of pyromellitic dianhydride into the reactor. This procedure was repeated four more times, until all of the pyromellitic dianhydride was added. Then, 60 pounds of orthodichlorobenzene were added to the reactor, in stages, and the temperature was raised to 160° C. and held there for 1-2 hours. The resulting copolyetherimide was recovered by high temperature, high vacuum distillation of the volatiles. It had a glass transition temperature, Tg, of 235° C., and was comprised of random repeating units of the formula

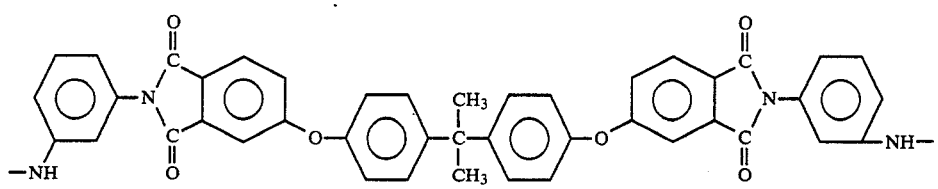

and of the formula

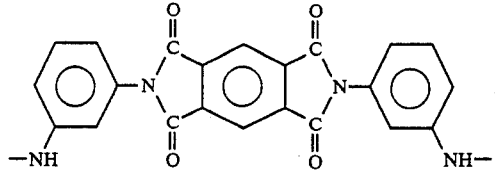

EXAMPLE 2

Using the procedure of Example 1, with minor modifications, copolyetherimides derived from 2,2-bis(4-(2,3-dicarboxyphenoxy)phenyl)propane dianhydride, pyromellitic dianhydride (PMDA) and m-phenylenediamine were prepared, with the amount of pyromellitic dianhydride in the copolyetherimide being varied as shown in the Table below. The polymers were extruded and injection molded into test bars. The results are shown in the Table.

TABLE

|  | 10% PMDA[1] | 20% PMDA[2] | Control[3] |
| --- | --- | --- | --- |
| Tg, °C. | 228 | 235 | 217 |
| Heat Distortion Temp., °C., | | | |
| annealed, 264 psi, ¼" | 222 | — | 216 |
| unannealed, 264 psi, ¼" | 203 | 210 | 198 |
| Melt Index, 371° C. | — | 0.5 | 3.48 |
| Flexural Modulus, psi | | | |
| at 25° C. | 472,000 | 474,000 | 460,000 |
| 93° C. | 380,000 | 393,000 | 384,000 |
| 176° C. | 319,000 | — | 317,000 |
| 200° C. | 292,000 | 307,750 | 253,000 |
| Flexural Strength, psi | | | |
| at 25° C. | 21,700 | 22,000 | 21,000 |
| 93° C. | 16,350 | 17,000 | 16,120 |
| 176° C. | 9,590 | — | 9,250 |
| 200° C. | 6,820 | 6,957 | 5,680 |

[1]made in m-cresol
[2]made in o-dichlorobenzene
[3]made in o-dichlorobenzene using no PMDA, with all ingredients being charged to reactor at same time Notably, the melt index of the control is much higher, which is indicative of a polymer of lower molecular weight. Such a polymer is less desirable than the other two shown (10% PMDA, and 20% PMDA, respectively), which have lower melt indices and, concomitantly, higher molecular weights and which will consequently possess better flexural properties after molding, as shown.

EXAMPLE 3

A reactor was charged with 964.19 grams of 2,2-bis(4-(2,3-dicarboxyphenoxy)phenyl)propane dianhydride, 7.66 grams of phthalic anhydride, and 0.22 gram of sodium benzophosphonate, and the resulting mixture was agitated for 20 to 30 minutes while 245.21 grams of meta-phenylene diamine were added. The temperature was raised to 130° C. with the condensate over the reactor being collected and drained off. After the temperature reached 130° C., the reactor was pressurized to 5 psig, using nitrogen, and 141.43 grams of benzophenonetert-dianhydride were added, in several portions. After the addition was completed, 1650 milliliters of ortho-dichlorobenzene were added and the temperature was raised to 160° C. and maintained there for 1-2 hours. The copolyetherimide which resulted was recovered.

All of the above-mentioned patents are incorporated herein by reference.

Other modifications and variations of the invention are possible in light of the above disclosure. It is to be understood, therefore, that changes may be made in the particular embodiments shown which are within the scope of the invention defined in the appended claims.

I claim:

1. A method for preparing a copolyetherimide, comprising
(a) providing a reaction mixture comprising
  (1) a dianhydride of the formula

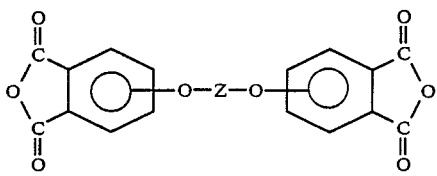

in which Z is a divalent arylene, with
  (2) a diamine of the formula

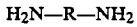

in which R is a divalent organic radical selected from the group consisting of hydrocarbon radicals;
(b) heating the reaction mixture to a temperature of at least 100° C. to initiate polymerization; and
(c) adding to the reaction mixture a dianhydride of the formula

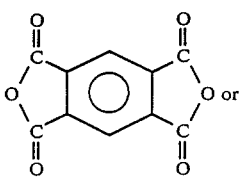

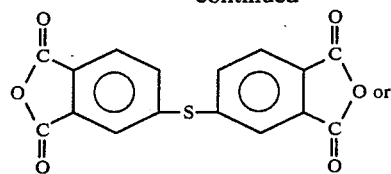

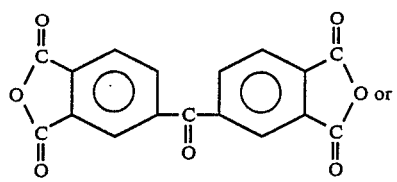

(iv) a mixture of any of the foregoing, while continuing to heat the reaction mixture at a temperature of at least 100° C., whereby said polyetherimide is formed.

2. A process according to claim 1, in which the reaction is conducted at a temperature of at least 120° C.

3. A process according to claim 2, in which the reaction is conducted at a temperature of from about 120° to about 200° C.

4. A process according to claim 1, in which the dianhydride added in step (a) is 2,2-bis(4-(2,3-dicarboxyphenoxy)phenyl)propane dianhydride, having the formula

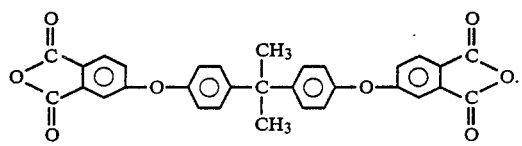

5. A process according to claim 4, in which the diamine is meta-phenylene diamine.

6. A process according to claim 5, in which the dianhydride, added in step (c) is pyromellitic dianhydride.

7. A process according to claim 5, in which the dianhydride added in step (c) is benzophenone-tert-dianhydride.

8. A process according to claim 1, in which the reaction is conducted in an organic solvent.

9. A process according to claim 8, in which the solvent is ortho-dichlorobenzene.

10. A process according to claim 1, in which in step (c) the dianhydride is added in individual portions of three or more.

11. A process according to claim 1, in which the reaction is conducted with a chain terminating compound present.

12. A process according to claim 11, in which the chain terminator is phthalic anhydride.

13. A copolyetherimide produced by the process of claim 1.

14. A copolyetherimide produced by the process of claim 6.

15. A copolyetherimide produced by the process of claim 7.

16. A copolyetherimide produced by the process of claim 10.

17. A copolyetherimide produced by the process of claim 12.

* * * * *